United States Patent [19]

Groothius

[11] Patent Number: 4,611,506
[45] Date of Patent: Sep. 16, 1986

[54] HYDRAULICALLY ACTUATED PLANETARY WHEEL DRIVE

[75] Inventor: Paul B. Groothius, Niles, Mich.

[73] Assignee: Clark Equipment Company, South Bend, Ind.

[21] Appl. No.: 490,077

[22] Filed: Apr. 29, 1983

[51] Int. Cl.$^4$ .................. F16H 3/44; F16D 25/00
[52] U.S. Cl. ........................ 74/794; 74/785; 192/86
[58] Field of Search ............ 74/794, 752 C, 785, 74/786, 787, 788, 411.5; 180/10, 70.1, 253; 192/86, 87.16, 87.15, 87.14

[56] References Cited

U.S. PATENT DOCUMENTS

| 1,370,378 | 3/1921 | Starr . | |
|---|---|---|---|
| 1,514,872 | 11/1924 | Starr | 74/785 |
| 2,633,218 | 3/1953 | Pielstick | 192/86 |
| 3,184,985 | 5/1965 | Dreitzler | 74/377 |
| 3,426,620 | 2/1969 | Pleska | 74/705 |
| 3,827,528 | 8/1974 | Shaffer | 180/253 |
| 4,270,412 | 6/1981 | Beijer et al. | 74/788 |
| 4,440,041 | 4/1984 | Bendtsen | 192/87.16 X |
| 4,440,042 | 4/1984 | Holdeman | 74/785 |

FOREIGN PATENT DOCUMENTS

| 1367309 | 6/1964 | France | 74/794 |
|---|---|---|---|
| 1177935 | 1/1970 | United Kingdom | 74/785 |

Primary Examiner—Kenneth J. Dorner
Assistant Examiner—David Novais
Attorney, Agent, or Firm—Kenneth C. Witt; J. C. Wiessler

[57] ABSTRACT

A drive mechanism located within a vehicle wheel at the outer end of a drive axle. The mechanism is operated by the operator of the vehicle by remote control from his normal operating position. The mechanism may be connected for the usual gear reduction drive or, at the option of the operator, moved to a second position.

11 Claims, 2 Drawing Figures

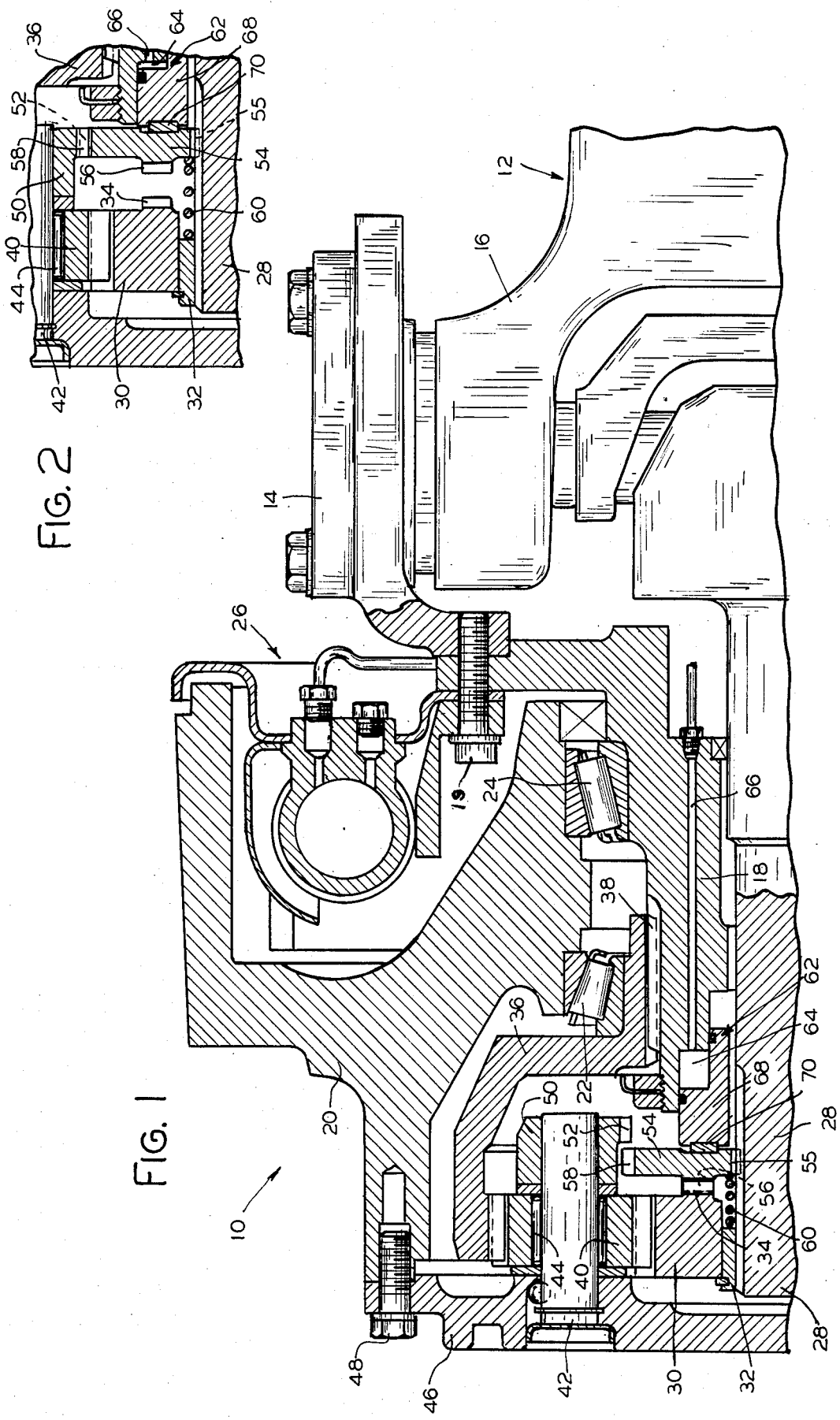

HYDRAULICALLY ACTUATED PLANETARY WHEEL DRIVE

BACKGROUND OF THE INVENTION

1. Field of the Invention

This invention relates to wheel drive mechanisms located at the outer ends of drive axles and more particularly to such mechanisms which can be disconnected or shifted to a different ratio.

2. Description of the Prior Art

In some uses of axles with gear drive mechanisms at the outer ends, particularly in heavy duty applications, it is desirable to be able to disconnect the drive mechanism or shift it to a different ratio. U.S. Pat. No. 3,184,985 Dreitzler affords a discussion of the circumstances when disconnection may be desirable and discloses a mechanism whereby disconnection may be achieved. However, the mechanism of the Dreitzler patent requires that the operator of the vehicle leave the operator's station and manually disconnect each wheel drive mecahnism at the wheel.

The present invention deals with the same problems but provides that the operator can disconnect the drive mechanisms at two or more wheels of a vehicle, or shift them to a different ratio, without leaving the operator's station.

U.S. Pat. No. 3,426,620 Pleska discloses a wheel drive comprising a pair of gear sets housed in a rotary wheel hub. The gear sets cooperatively provide one speed reduction drive and one gear set provides another speed reduction drive having less speed reduction with both drives established by clutch engagement accomplished by movement of an annular gear member of one of the gear sets. A neutral or non-drive position is also provided.

U.S. Pat. No. 1,370,373 Starr discloses a wheel drive mechanism wherein three choices are provided, that is, a gear reduction drive, direct drive and a neutral or non-drive position. One of the three choices is selected by moving the axle shaft axially.

SUMMARY OF THE INVENTION

The present invention utilizes a planetary gear set in which the ring gear is connected to the axle spindle and the planet carrier is connected to the wheel hub. The sun gear is mounted for free rotation on the axle shaft but a remotely controlled clutch mechanism is provided which connects the sun gear to the axle shaft for operation in one mode and disconnects the sun gear from the axle shaft for operation in another mode or modes.

BRIEF DESCRIPTION OF THE DRAWING

FIG. 1 of the drawing is an axial sectional view which shows a preferred embodiment of the invention with the clutch mechanism in one position, while FIG. 2 is a fragmentary view of the sun gear portion of the invention showing the clutch mechanism in another position.

DESCRIPTION OF THE PREFERRED EMBODIMENTS

On the drawing the numeral 10 indicates generally a wheel drive mechanism in accordance with the present invention, such mechanism comprising one end of a steering drive axle 12 which includes a pivot connection 14 between the main housing 16 of the axle and wheel drive mechanism 10 to provide steering capability. The mechanism 10 includes a spindle 18 which is secured by a plurality of machine screws, one of which is shown at 19, to housing 16 through pivot connection 14.

The wheel drive mechanism 10 also includes a hub 20 which is rotatably mounted on spindle 18 by means of roller bearings 22 and 24. A rim member not shown which carries the tire is secured around the outer periphery of hub 20. A conventional friction brake mechanism 26 is provided for braking the hub 20 and thus the entire wheel assembly of which this invention is a part.

An axle shaft 28 which is a part of the vehicle drive train is located within spindle 18 and extends outwardly beyond the outboard end of the spindle. A sun gear 30 is mounted on shaft 28 by means of a bushing 32 which permits rotation of the sun gear with respect to the axle shaft in one or more operating modes. Sun gear 30 also includes a tooth clutch portion 34. Surrounding the sun gear is a ring gear 36 which is connected by splines or the equivalent at location 38 to spindle 18 whereby ring gear 36 is fixed and does not rotate.

Interposed between sun gear 30 and ring gear 36, and meshing with both, is a planet gear 40. Normally several such planet gears are utilized. Each planet gear is mounted for rotation on a planet pin 42 and suitable needle type or other anti-friction bearings are provided at 44. Each planet pin 42 is a part of a planet carrier indicated generally at 46 which is secured in a suitable manner such as by machine screws 48 to hub 20. In the embodiment illustrated on the drawing which is the best mode contemplated for carrying out the invention the planet carrier 46 includes a portion 50 which has an internal tooth clutch portion at 52.

The wheel drive mechanism 10 includes an axially movable clutch collar 54, connected at 55 by splines or the equivalent to shaft 28, and which has a tooth clutch portion 56 facing tooth clutch portion 34 on sun gear 30. Clutch collar 54 also has an external tooth clutch portion 58 which is arranged to mesh with tooth clutch portion 52 in the position shown in FIG. 2 of the drawing and to be disengaged from tooth clutch portion 52 in the position illustrated in FIG. 1 of the drawing. Clutch collar 54 is urged away from sun gear 30 by a coil spring 60 located between the bushing 32 and clutch collar 54. Clutch collar 54 may be moved outwardly against the force of spring 60 to engage clutch teeth 56 with clutch teeth 34 by means of a remotely controlled mechanism indicated generally at 62. As shown mechanism 62 comprises an annular stepped piston 68 encircling shaft 28 and slidable in bores in the end of spindle 18, and a chamber 64 which may be supplied with pressurized hydraulic fluid through a conduit or bore 66 in spindle 18 to move piston 68 to the left as shown on the drawing and, by means of an intervening bearing member 70, move clutch collar 54 outwardly. Hydraulic pressure in the conduit 66 may be controlled remotely by a suitable valve located at the operator's station of the vehicle.

When collar 54 is engaged with sun gear 30 the rotation of axle 28 drives sun gear 30 which, with ring gear 36 as the reaction member, rotates planet carrier 46 to drive the hub 20 and the rim and tire mounted thereon. This is the normal operating position and there is a considerable gear reduction between shaft 28 and the hub 20, providing increased torque at reduced speed at the hub. If it should be desired to tow the vehicle of which this wheel drive mechanism is a part, at a greater than normal speed for this vehicle, and the connection between clutch collar 54 and sun gear 30 were maintained, the axle 28 and hence other parts of the vehicle drive line would be rotated at greater than normal speed, with abnormal wear and possible damage to the drive line from such operation. To provide for such a high speed towing operation the operator needs merely to release the hydraulic pressure from chamber 64, allowing the piston 68 to retract under the force of spring 60 and thereby disengage clutch teeth 34 and 56. Such operation also engages clutch teeth 52 and 58 whereby clutch collar 54 is then connected directly between shaft 28 and carrier 46 and thus to the hub 20. If the vehicle is then towed the axle 28 will be rotated at the same speed as hub 20 and the entire vehicle drive line will be operated at a lower speed than would have been the case if clutch collar 54 remained connected to sun gear 30.

In a second embodiment of this invention the clutch teeth 52 and 58 can be omitted whereby if the vehicle is towed when clutch teeth 34 and 56 are not engaged the wheel drive mechanism is disconnected and the hub 20 does not turn the axle 28. This second embodiment can be used in a vehicle having multiple drive axles to selectively disconnect any one or more of the axles remotely from the operator's station. For example, a four wheel drive vehicle can be readily shifted by the vehicle operator between four wheel drive and two wheel drive by utilizing this invention at the two ends of one of the axles to selectively disconnect the wheel drive mechanisms of said one of the axles.

In a third embodiment the proportions of clutches 34,56 and 52,58 and associated parts are changed and remotely controlled operating mechanism 62 is altered, to provide three operating positions, one in which clutch 34,56 is engaged, another in which clutch 52,58 is engaged, and a third intermediate position in which neither clutch is engaged.

While I have illustrated and described herein three embodiments for carrying out my invention it will be appreciated that modifications may be made. Accordingly, it should be understood that I intend to cover by the appended claims all such modifications which fall within the true spirit and scope of my invention.

I claim:

1. A wheel drive mechanism for an axle having a housing and a cantilever mounted spindle having an outward free end and a mounted inner end connected to the housing, comprising
    a hub rotatably mounted on the spindle,
    a shaft within the spindle extending beyond the outward end of the spindle,
    the said shaft being rotatable about its axis but not movable axially,
    a ring gear connected to said spindle,
    at least one planet gear in mesh with said ring gear and carried on a carrier which is connected to said hub,
    a sun gear in mesh with said planet gear and rotatably mounted on said shaft,
    said ring, planet and sun gears located outwardly of said hub,
    said sun gear having a first clutch portion thereon,
    an axially movable clutch member rotatable with said shaft having a second clutch portion thereon arranged to engage said first clutch portion in one position of said clutch member,
    a remotely operable hydraulic mechanism for selectively moving said clutch member axially to said one position thereby to connect said sun gear for conjoint rotation with said shaft, and
    said hydraulic mechanism comprising an annular piston encircling said shaft and slidable in a bore in the end of said spindle.

2. A wheel drive mechanism as in claim 1 wherein said carrier has a third clutch portion thereon, said clutch member has a fourth clutch portion thereon, and said remotely operable mechanism is operable to move said clutch member to a second position wherein said third clutch portion engages said fourth clutch portion thereby connecting said shaft and said carrier and said hub for conjoint rotation.

3. A wheel drive mechanism as in claim 1 wherein both said clutch portions are a tooth type.

4. A wheel drive mechanism as in claim 2 wherein all said clutch portions are a tooth type.

5. A wheel drive mechanism as in claim 2 wherein said clutch member has a third position intermediate said first and second positions in which said shaft is disconnected from both said sun gear and said hub.

6. A wheel drive mechanism as in claim 5 wherein said remotely operable mechanism comprises a stepped annular piston encircling said shaft and slidable in bores in the end of said spindle, forming a variable volume hydraulic chamber with said shaft, and said spindle includes a conduit through it for supplying pressurized hydraulic fluid to said chamber.

7. A wheel drive mechanism as in claim 1 wherein said remotely operable mechanism comprises a stepped annular piston having two different external diameters encircling said shaft and slidable in two bores of different internal diameters in the end of said spindle.

8. A wheel drive mechanism as in claim 7 wherein said stepped annular piston forms a variable volume hydraulic chamber with said spindle and said spindle includes a conduit through it for supplying pressurized hydraulic fluid to said chamber.

9. A wheel drive mechanism as in claim 7 wherein said remotely operable mechanism includes a spring biasing said clutch member away from said sun gear.

10. A wheel drive mechanism as in claim 9 wherein said remotely operable mechanism further comprises a bearing member between said piston and said clutch member.

11. A wheel drive mechanism as in claim 10 wherein said stepped annular piston forms a variable volume hydraulic chamber with said spindle and said spindle includes a conduit through it for supplying pressurized hydraulic fluid to said chamber.

* * * * *